United States Patent
Khan et al.

(10) Patent No.: US 12,498,747 B2
(45) Date of Patent: Dec. 16, 2025

(54) SHORT CIRCUIT FAULT PROTECTION FOR A REGULATOR

(71) Applicant: STMicroelectronics International N.V., Geneva (CH)

(72) Inventors: Zubair Khan, Greater Noida (IN); Sandeep Kaushik, Greater Noida (IN)

(73) Assignee: STMicroelectronics International N.V., Geneva (CH)

( * ) Notice: Subject to any disclaimer, the term of this patent is extended or adjusted under 35 U.S.C. 154(b) by 356 days.

(21) Appl. No.: 18/356,818

(22) Filed: Jul. 21, 2023

(65) Prior Publication Data

US 2024/0045458 A1    Feb. 8, 2024

Related U.S. Application Data

(60) Provisional application No. 63/395,642, filed on Aug. 5, 2022.

(51) Int. Cl.

| G05F 1/575 | (2006.01) |
|---|---|
| G05F 1/46 | (2006.01) |
| G05F 1/569 | (2006.01) |
| G05F 1/61 | (2006.01) |
| G05F 1/571 | (2006.01) |
| G05F 1/573 | (2006.01) |

(52) U.S. Cl.
CPC .............. *G05F 1/575* (2013.01); *G05F 1/468* (2013.01); *G05F 1/569* (2013.01); *G05F 1/61* (2013.01); *G05F 1/571* (2013.01); *G05F 1/573* (2013.01)

(58) Field of Classification Search
CPC .......... G05F 1/575; G05F 1/468; G05F 1/569; G05F 1/61; G05F 1/571; G05F 1/573; H02H 3/20; H02H 9/02
See application file for complete search history.

(56) References Cited

U.S. PATENT DOCUMENTS

| 6,804,102 | B2 | 10/2004 | Hamon et al. | |
|---|---|---|---|---|
| 7,315,153 | B2 | 1/2008 | Tazawa et al. | |
| 9,170,591 | B2 | 10/2015 | Pons | |
| 2016/0048148 | A1* | 2/2016 | Lee | G05F 1/575 |
| | | | | 323/280 |
| 2016/0349776 | A1* | 12/2016 | Conte | G05F 1/575 |
| 2017/0090494 | A1* | 3/2017 | Cui | G05F 1/562 |
| 2017/0242449 | A1* | 8/2017 | Chen | G05F 1/575 |
| 2019/0050012 | A1* | 2/2019 | Yang | G05F 1/575 |
| 2019/0058321 | A1* | 2/2019 | Okajima | G05F 1/571 |

* cited by examiner

*Primary Examiner* — Monica Lewis
*Assistant Examiner* — Lakaisha Jackson
(74) *Attorney, Agent, or Firm* — Seed IP Law Group LLP

(57) ABSTRACT

Provided are techniques for detecting a short circuit fault at an output of a regulator and protecting the regulator from the short circuit fault. An error amplifier receives a reference voltage and a feedback voltage and compares comparing the reference voltage with the feedback voltage for driving a power transistor of the regulator. A modification stage compares an output voltage of the voltage regulator with a fault reference voltage and in response to determining that the output voltage of the voltage regulator is less than the fault reference voltage, drives the power transistor using an internal node of the error amplifier by changing states of a first switch and a second switch and supplies the reference voltage to both the first and second inputs of the error amplifier by changing states of a third switch and a fourth switch.

20 Claims, 2 Drawing Sheets

SHORT CIRCUIT FAULT PROTECTION FOR A REGULATOR

BACKGROUND

Technical Field

The present disclosure is directed to detecting a short circuit fault at an output of a regulator. The present disclosure is also directed to protecting a regulator, such as a low drop-out (LDO) regulator, from the short circuit fault.

Description of the Related Art

LDO regulators are used to maintain a constant DC output voltage and are designed to operate with a small input-output voltage differential. LDOs are characterized by high-efficiency operation and low heat dissipation and are widely used for industrial and automotive applications. The increasing demand for portable and battery-operated products has resulted in the circuits being operated over a wide range of supply voltage and multi-voltage platforms. As a consequence, standby and quiescent current flow are major concerns considering also that these regulators are expected to operate in a wide temperature range ($-40°$ C. to $125°$ C., typically).

BRIEF SUMMARY

The present disclosure is directed to devices and methods related to a regulator when an output of the regulator is shorted, e.g., to a ground reference. Generally, the regulator includes an error amplifier that receives a reference voltage over a first input and amplifies a difference between the reference voltage and a feedback voltage. An output of the error amplifier drives a transistor to supply current to the output of the regulator. In some examples, a voltage divider may be coupled to the output of the transistor for detecting any changes in the output of the regulator and providing the feedback voltage to be compared with the reference voltage. The error amplifier and the transistor operate with a power supply. In some examples, the power supply may a battery. Thus, increasing the supplied current by the transistor drains more power from the battery that may reduce battery life. Measuring the supplied current by the transistor is beneficial in reducing unwanted current drain of the battery. In particular, when the output of the regulator is shorted, it may cause a large current flow from the transistor, and consequently a large power drain from the battery.

In some embodiments of the present disclosure, a modification stage is used to protect the regulator by detecting a short circuit at the output of the regulator and modifying the regulator operation in response to the short circuit detection. In some examples, the modification stage includes a supply monitoring stage that compares the output of the regulator with a short circuit fault voltage reference. The supply monitoring stage generates one or more control signals based on the comparison. The one or more control signals are used to modify regulator operation. The one or more control signals change states of when a short circuit fault is detected. Changing the states of the switches modify regulator operation by limiting the current supplied by the transistor.

DETAILED DESCRIPTION

The present disclosure is directed to a controlling a regulator including a low drop-out (LDO) regulator. Generally, LDO regulators are used in integrated circuits (ICs) to provide a predetermined voltage with low noise to circuit components from a voltage supply (e.g., a battery). An LDO regulator is said to have a low drop-out since it enables providing a voltage close to the voltage supply. Current draining from the voltage supply such as a rechargeable battery is a significant parameter which determines battery life. The current drain from the battery may increase in a circuit when there is additional internal noise (e.g., from switching components) and/or external noise (e.g., electromagnetic (EM) induced noise into the circuit). In addition, an external circuit coupled to an output of the regulator may drain extra current from the regulator in some fault conditions. In particular, a fault condition may be a short circuit at the output of the regulator which drains a large current from the regulator and the battery and consequently may result in degradation of the battery. For instance, the short circuit fault may happen when the external circuit is a switch coupled to the ground reference. In some examples, an induced noise may result in a short circuit fault at the output of the regulator. Thus, protecting a regulator against the short circuit fault has the benefit of increasing the battery life by limiting the current supply from the regulator.

A protection circuit may include a current sensor that monitors the output current of the regulator. The current sensor may detect a fault short circuit when a large current is flowing through the output of the regulator. In response to the fault short circuit detection, a protection stage may turn off the regulator to protect the voltage supply of the regulator. Turning off the regulator causes the current at the output to be reduced until the current sensor detects a normal condition. By detecting the normal condition, the protection stage turns on the regulator. If the short circuit still exists at the output of the regulator, the protection stage continues turning off the regulator. In the present disclosure, a protection stage may limit an output current of the regulator when a fault short circuit is detected. The protection stage includes a plurality of switches to control the output current of the regulator during the short circuit fault and while the regulator remains turned on. Hence, the protection stage may not induce an internal noise and consequently increases stability of the regulator.

Figure 1A:
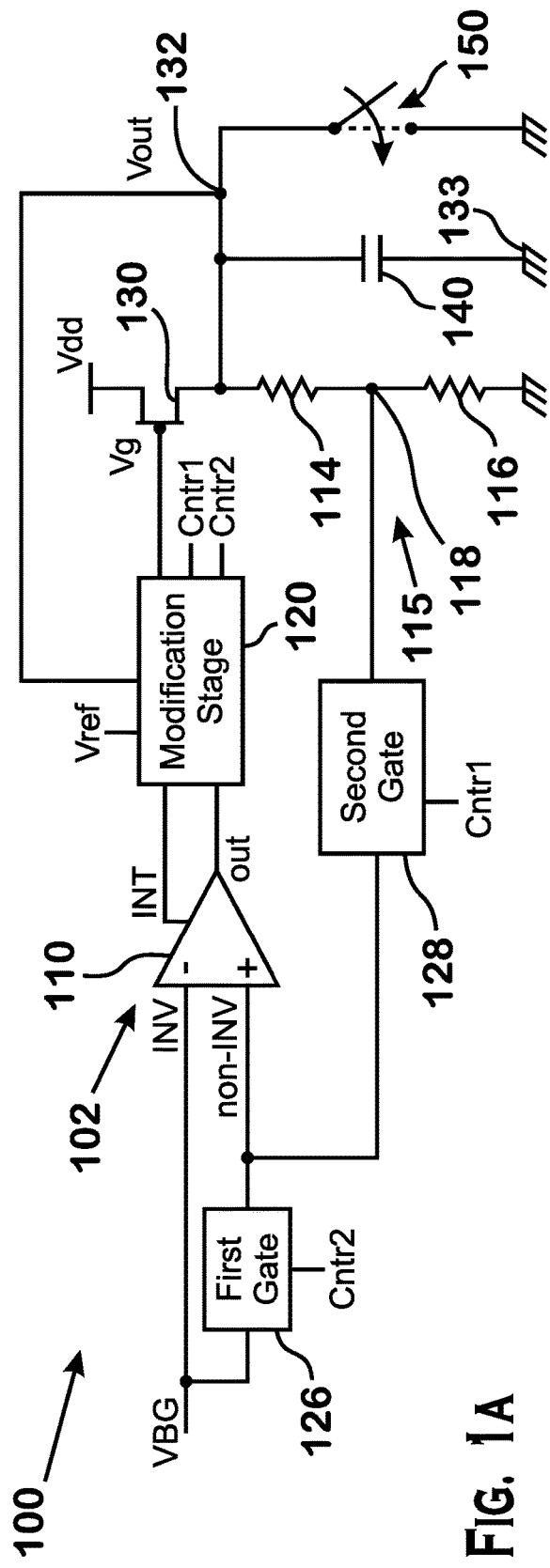
FIG. 1A shows of a low drop-out (LDO) regulator circuit, in accordance with some embodiments.

FIG. 1A shows a system 100 for controlling a regulator 102. The regulator 102, which may be a low drop-out (LDO) regulator, includes an error amplifier 110 and a power transistor 130. The system 100 also includes a modification stage 120, a power transistor 130, first and second gates 126, 128, a voltage divider circuit 115 including first and second resistors 114 and 116 and a capacitor 140.

The error amplifier 110 has an inverting input (INV) over which the error amplifier 110 receives a reference voltage VBG (e.g., a bandgap reference voltage). The error amplifier 110 has a non-inverting input (non-INV) and an output (out). The modification stage 120 has a first input coupled to the output of the error amplifier 110 and a second input coupled to an internal node of the error amplifier 110 and over which the modification stage 120 receives an internal node voltage (INT). The modification stage 120 has a third input configured to receive a fault reference voltage (Vref) and a fourth input coupled to an output node 132 of the regulator 102. The modification stage has a first output coupled to the control terminal of the power transistor 130 and second and third outputs configured to output first and second control signals (Cntr1, Cntr2), respectively.

The power transistor 130 has a first conduction terminal configured to receive a supply voltage (Vdd) and a second conduction terminal coupled to the output node 132 of the regulator 102. The capacitance has a first side coupled to the output node 132 and a second side coupled to a reference voltage node 133. The voltage divider circuit 115 has a first terminal coupled to the output node 132 and a second terminal coupled to the reference voltage node 133. The voltage divider circuit 115 has a feedback node 118.

The first gate 126 has a first conduction terminal coupled to the inverting input (INV) of the error amplifier 110 and configured to receive the reference voltage (VGB) and a second conduction terminal coupled to the non-inverting input (non-INV) of the error amplifier 110. The first gate 126 has a control input coupled to the second output of the modification stage. The second gate 128 has a first conduction terminal coupled to the non-inverting input (non-INV) of the error amplifier 110 and a second conduction terminal coupled to the feedback node 118 of the voltage divider circuit 115. The second gate 128 has a control input coupled to the third output of the modification stage.

The modification stage 120 is configured to mitigate the effects of short circuit faults on the regulator 100. The amplified differential voltage at the output of the error amplifier 110 is applied to the control terminal of the power transistor 130 as a gate voltage Vg. The gate voltage Vg drives the power transistor 130 to supply current to an output of the regulator 100.

An output voltage (Vout) of the regulator 100 is applied to the voltage divider circuit 115. The voltage divider 115 provides a feedback voltage over feedback node 118. The feedback voltage depends on the current passing through the resistors 114 and 116. In non-fault (e.g., normal) operation of the regulator 100, the feedback voltage and the power transistor 130 maintain a substantially constant output voltage Vout by compensating the effect of changing an output load (not shown) coupled to an output of the regulator 102.

The capacitor 140 may be a part of the regulator 102 or external to the regulator 102 (and part of an external circuit). The capacitor 140 mitigates unwanted oscillation. For example, by changing the output load coupled to the regulator, the capacitor 140 mitigates sudden changes of the output voltage Vout which may create an oscillation on the power transistor 130.

As shown in FIG. 1A, a switch 150 illustrates an equivalent load coupled to the regulator 102. The switch 150 may short the output voltage Vout to a reference voltage which causes a fault voltage condition. The modification stage 120 detects the fault short signal based on by measuring the output voltage Vout of the output node 132.

The error amplifier 110 may be a differential amplifier that amplifies a difference between the reference voltage VBG and the voltage received over the non-inverting input (non-INV) of the error amplifier 110. When the second gate 128 is conductive, the voltage received over the non-inverting input is the feedback voltage from the output of the regulator 102. The regulator 100 detects a difference between the reference voltage VBG and the feedback voltage. If the feedback voltage is less than the reference voltage VBG, then the error amplifier 110 amplifies the difference to generate a differential voltage which increases the output voltage Vout to match the reference voltage VBG.

The power transistor 130 controls the output voltage Vout using the gate voltage Vg. The power transistor 130 may be supplied by a battery that provides the supply voltage Vdd. The supply voltage Vdd may also power the error amplifier 110. The power transistor 130 may be a metal-oxide-semiconductor (MOS) transistor. When the reference voltage VBG is applied to the inverting input, the power transistor 130 may be a p-type channel MOS (PMOS), in which a source of the PMOS is coupled to the voltage supply Vdd and a drain of the PMOS is coupled to the output node 132. Thus, a negative differential voltage of the error amplifier 110 may turn on the PMOS to supply the output node 132. Alternatively, the power transistor 130 may be a n-type channel MOS (NMOS). Further, the power transistor 130 may be a ballast transistor. A ballast transistor provides regulator stability.

The modification stage 120 may compare the output voltage Vout with the fault reference voltage Vref to detect the short circuit fault at the output node 132 (e.g., which may occur due to closing the switch 150). In response to detecting the short circuit fault, the modification stage 120 may sets logical levels of the first control signal (Cntr1) and the second control signal (Cntr2). The first and second control signals cause the first and second gates 126, 128 as well as third and fourth gates 122, 124 described herein with reference to FIG. 1B to transition between the conductive and non-conductive states. The gates 122, 124, 126, 128 may be switches and may change states based on the first and second control signals (Cntr1, Cntr2) to limit the output current of the regulator 102 during a short circuit condition.

As described herein, the error amplifier 110 provides a differential amplified signal over the output (out). In addition, the error amplifier 110 includes an internal nodes that serves as an internal current source. The internal nodes provides a substantially constant current when the error amplifier is operating in a common mode. When the first gate 126 is off (open) and the second gate 128 is on (closed), the error amplifier 110 is operates in a differential mode due to the fact that the error amplifier 110 does not receive an identical voltage over its inputs. When the first gate 126 is on (close) and the second gate 128 is off, the inverting and non-inverting inputs have a same voltage and the error amplifier 110 operates in common mode. In common mode operation, the output (out) of the error amplifier 110 is substantially zero volts.

Conversely, when the second gate 128 is on (closed), a feedback voltage from the feedback node 118 is connected to the non-inverting input of the error amplifier 110. When the second gate 128 is off (open), the feedback voltage from the feedback node 118 is disconnected from the non-inverting input of the error amplifier 110. The modification stage 120 turns on the first gate 126 by asserting the second control signal (Cntr2). The second control signal (Cntr2) may be asserted by setting the second control signal (Cntr2) to a logical one or logical zero depending on convention. The second gate 128 may be turned on by asserting the first control signal (Cntr1). The first and second control signals (Cntr1, Cntr2) have opposite states. An inverter may receive the first control signal (Cntr1) and generate the second control signal (Cntr2) from the first control signal (Cntr1) or vice-versa.

Figure 1B:
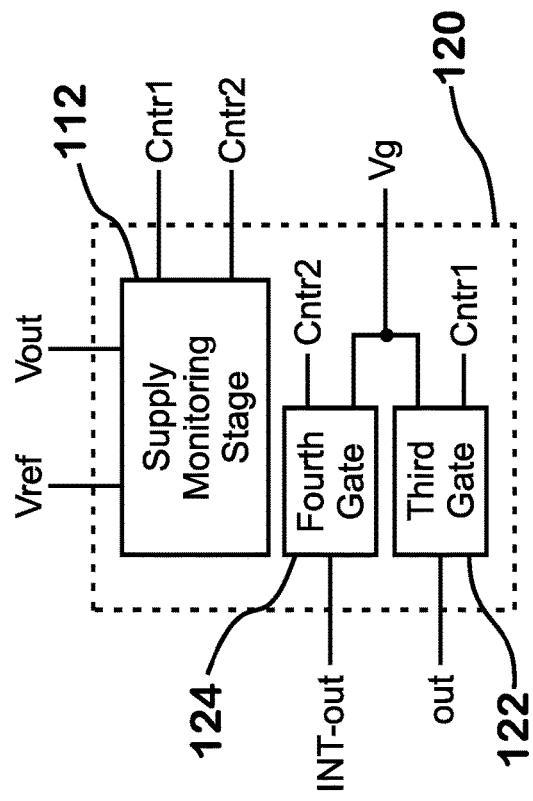
FIG. 1B shows a modification stage in accordance with an embodiment.

FIG. 1B shows the modification stage 120 described with reference to FIG. 1A. The modification stage 120 includes a supply monitoring stage 112 for monitoring the output voltage Vout of the regulator 100 and detecting the short circuit fault. The supply monitoring stage 112 has two inputs (corresponding to the third input and the fourth input of the modification stage 120) and configured to receive the fault reference voltage Vref and the output voltage Vout. The supply monitoring stage 112 has two outputs configured to output the first control signal Cntr1 and the second control signal Cntr2. In addition, the modification stage 120 includes a third gate 122 and a fourth switch 124. The third gate 122 has two conductive terminals coupled to the output of the error amplifier 110 and the control terminal of the power transistor 130, respectively. The fourth gate 124 has two conductive terminals coupled to between the internal node of the error amplifier 110 described herein and the control terminal of the power transistor 130, respectively.

The monitoring stage 112 compares the output voltage Vout with the fault reference voltage Vref. The fault reference voltage Vref may be 1.7V to 1.9V, and the output voltage Vout may be 2V to 2.4V. The monitoring stage 112 may detect the short circuit fault when the output voltage Vout drops below about 1.7V to about 1.9V. The voltage drop may be indicative of the occurrence of the short circuit fault. In response to comparing the output voltage Vout with the fault reference voltage Vref, the monitoring stage 112 may generate the first and second control signals. The monitoring stage 112 may assert (or set to high) a logical level of the first control signal Cntr1 and deassert (set to low) the second control signal Cntr2 is in a non-fault mode operation and when Vout is greater than Vref. The monitoring stage 112 may assert the second control signal Cntr2 and deassert the first control signal Cntr1 in short circuit fault operation and when Vout is less than Vref.

The third gate 122 and the second gate 128 turn on in response to the first control signal (Cntr1) being asserted. In non-fault operation, asserting the first control signal Cntr1 keeps the third date 122 and the second gate 128 in a conductive state. The output of the error amplifier 110 is coupled to the control terminal of the power transistor 130 by the third gate 122 and the feedback voltage of feedback node 118 is coupled to the non-inverting input of the error amplifier 110 by the second gate 128.

The second control signal Cntr2 controls the fourth gate 124 and the first gate 126. In non-fault operation, the second control signal Cntr2 is deasserted to open the fourth gate 124 and the first gate 126. Thus, the internal output of the error amplifier 110 is disconnected from the gate of the power transistor 130 by the fourth gate 124 and the inverting input is disconnected from the non-inverting input of the error amplifier 110 by the first gate 126 in non-fault operation of the regulator 100. The state of the first control signal Cntr1 may be a reverse logical level of the second control signal Cntr2. Thus, in non-fault operation, the first control signal Cntr1 is a logical one and the second control signal Cntr2 is a logical zero.

When the monitoring stage 112 detects the short circuit fault, then the internal voltage of the error amplifier 110 is coupled to the gate of the power transistor 130 by the fourth gate 124 and the inverting input is coupled to the non-inverting input of the error amplifier 110 by the first gate 126. In this fashion, the output of the error amplifier 110 is disconnected from the gate of the power transistor 130 by the third gate 122 and the feedback voltage is disconnected from the non-inverting input of the error amplifier 110 by the second gate 128.

The fault operation described herein prevents the short circuit fault at the output of the regulator from decreasing the output voltage Vout and the feedback voltage and creating a large differential voltage at the inputs of the error amplifier 110. The large differential voltage may result in supplying excessive current to the power transistor 130 by the error amplifier 110 to compensate the output voltage Vout. Hence, by opening the second gate 128 during the short circuit fault, feedback loop from the output of the regulator is disconnected from the non-inverting input to prevent coupling the large differential voltage to the inputs of the error amplifier 110. In addition, by closing the first gate 126 during the short circuit fault, the voltage on the inverting input is the same as the voltage on the non-inverting input of the error amplifier 110. Thus, the output of the error amplifier that is coupled to a differential circuit is zero volts.

It is noted that coupling the output of the error amplifier 110 (rather than the internal node of the error amplifier 110) to the power transistor 130 risks supplying excessive current to the power transistor 130 in a short circuit fault. In addition, turning off the power transistor 130 may not be desired because doing so risks introducing internal noise in the regulator 102 as well as degrading the lifetime of the power transistor 130. Thus, to avoid supplying the excessive current into the power transistor 130 while keeping the power transistor 130 turned on, the third gate 122 disconnects the output of the error amplifier 110 from the gate of the power transistor 130 while the fourth gate 124 connects the internal node of the error amplifier 110 to the gate of the power transistor 130. The internal node of the error amplifier 110 serves as an internal current source that induces a constant current on the gate of the power transistor 130. The constant current is typically lower that a threshold current. Hence, during the short circuit fault, the current supplied to the power transistor 130 is limited to a relatively safe value and the output of the regulator 102 may not drain excessive current and energy from the voltage supply during the fault.

Figure 2:
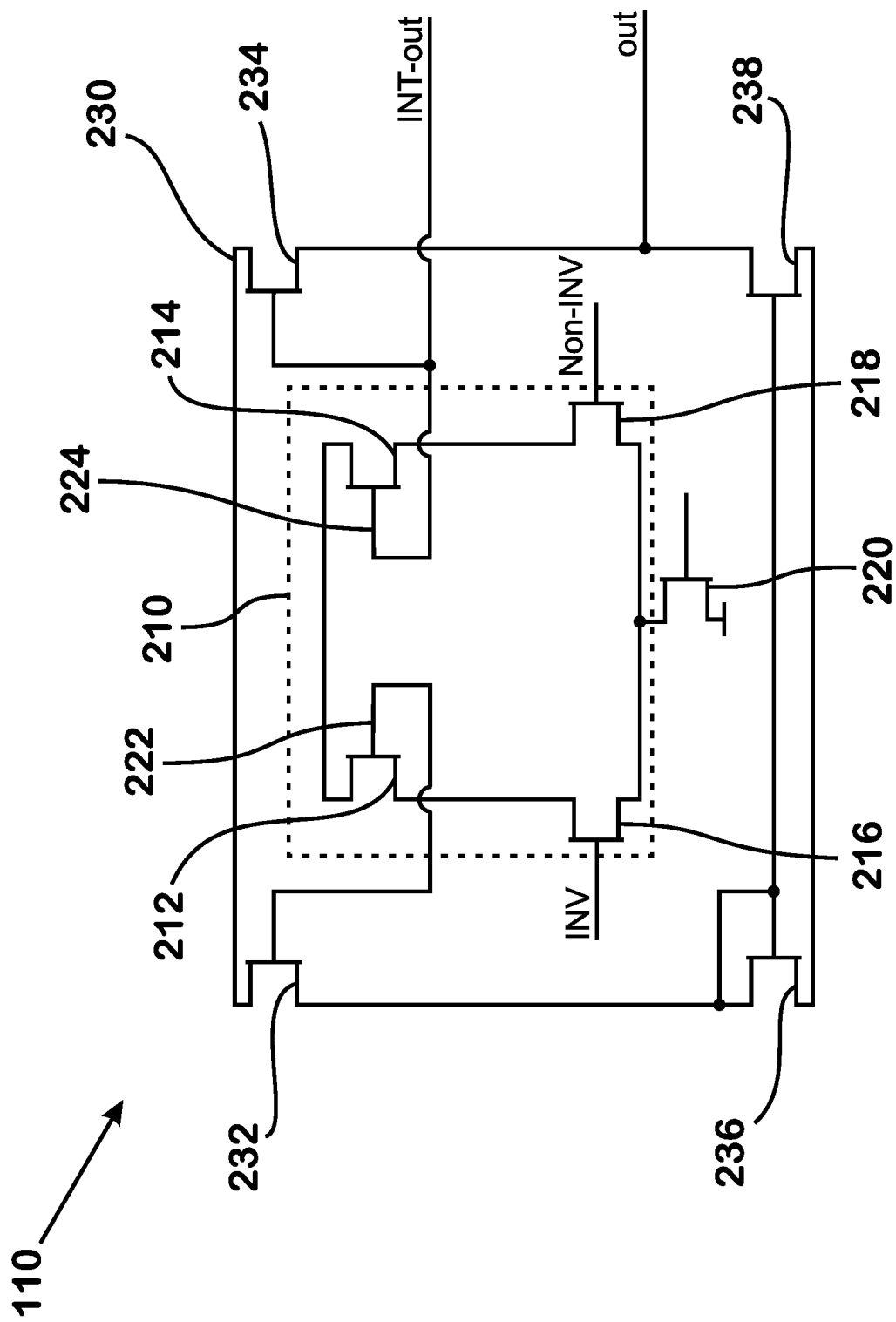
FIG. 2 shows an error amplifier in accordance with an embodiment.

FIG. 2 shows the error amplifier 110 described with reference to FIG. 1A. The error amplifier 110 includes a first stage 210 coupled to a source transistor 220. The first stage 210 includes first and second cross-coupled transistors 212, 214, first and second input transistors 216, 218, and first and second nodes 222, 224. A second stage 230 is coupled to the first stage 210 to amplify differential input of the error amplifier 110. The second stage 230 includes first and second input transistors 232, 234 and first and second current mirror transistors 236, 238. Gate terminals of the first and second input transistors 232, 234 are coupled to the first and second nodes 222, 224, respectively.

The source transistor 220 is a current source that provides current that passes through two branches of the first stage 210. The inverting and non-inverting inputs of the error amplifier 110 are coupled to gate terminals of the first and second input transistors 216, 218, respectively, of the first stage 210. The output of the error amplifier 110 is coupled to the second stage 230, between the second input transistor 234 and the second current mirror transistor 238. The internal node voltage (INT) of the error amplifier 110 is tapped at the second node 224, which serves as the internal node of the error amplifier 110.

When the inverting input is different than the non-inverting input, the error amplifier 110 operates in a differential mode and amplifies the difference between the inverting and non-inverting inputs to supply an output. When the inverting input is the same as the non-inverting input, the error amplifier 110 operates in a common mode and the output voltage of the error amplifier 110 may be close to zero volts. During the common mode operation, the constant current supplied by the source transistor 220 into the first stage 210 may be equally divided between the two branches of the first stage 210. Hence, a constant current proportional to the current of the source transistor 220 is provided at the second node 224.

The second node 224 is coupled to the gates of the transistors 214 and 234 in the current mirror circuit, which results in a lower current than the current passing through the drain-source branch of the current mirror circuit. By coupling the second node 224 of the error amplifier 110 to the gate of the power transistor 130 during the short circuit fault, the power transistor 130 is coupled to the current mirror circuit, such as an additional current mirror stage, which replicates the constant current of the first stage 210. This circuit topology limits the current supply from the power transistor 130 during the short circuit fault. Limiting the current prevents excessive heating of the regulator 102 due to a large current drain and increases the battery life by reducing power drain during the short circuit fault. In addition, the regulator 102 is protected against excessive internal noise by keeping the power transistor 130 turned on during the short circuit fault and frequent switching if the power transistor 130 is minimized.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
an error amplifier having a first input, a second input, an internal node, and an output, the error amplifier being configured to:
receive a reference voltage at the first input and a feedback voltage at the second input; and
compare the reference voltage with the feedback voltage for driving a power transistor of a voltage regulator; and
a modification stage including a plurality of switches and configured to:
compare an output voltage of the voltage regulator with a fault reference voltage; and
in response to determining that the output voltage of the voltage regulator is less than the fault reference voltage:
supply the reference voltage to both the first and second inputs of the error amplifier; and
drive the power transistor using the internal node of the error amplifier.

2. The device of claim 1, wherein the modification stage is configured to:
in response to determining that the output voltage of the voltage regulator is less than the fault reference voltage, disconnect the feedback voltage from the second input.

3. The device of claim 2, wherein the modification stage includes a supply monitoring stage configured to:
control the plurality of switches by at least:
generating a first control signal and a second control signal in response to comparing the output voltage of the voltage regulator with the fault reference voltage, wherein the first control signal is a complementary signal to the second control signal.

4. The device of claim 3, wherein the plurality of switches include:

a first switch having a first conduction terminal coupled to the output of the error amplifier and a second conduction terminal coupled to the power transistor; and
a second switch having a first conduction terminal coupled to the internal node and a second conduction terminal coupled to the power transistor.

5. The device of claim 4, wherein the power transistor is configured to be driven using an internal node voltage of the internal node of the error amplifier by placing the first switch in a non-conductive state using the first control signal and placing the second switch in a conductive state using the second control signal.

6. The device of claim 3, wherein the plurality of switches include:
a third switch coupled between the first input and the second input; and
a fourth switch coupled between the second input and a feedback node that provides the feedback voltage.

7. The device of claim 6, wherein supplying the reference voltage to both the first and second inputs of the error amplifier includes switching on the third switch based on the second control signal.

8. The device of claim 6, wherein disconnecting the feedback voltage from the second input includes switching off the fourth switch based on the first control signal.

9. The device of claim 6, comprising:
a voltage divider circuit including a first resistor coupled between the power transistor and the feedback node and a second resistor coupled between the feedback node and a reference voltage node.

10. The device of claim 1, wherein the voltage regulator is a low-dropout linear regulator, and the modification stage detects a short circuit fault of the low-dropout linear regulator.

11. The device of claim 1, wherein the error amplifier amplifies a difference between the reference voltage and the feedback voltage.

12. A method of controlling a voltage regulator, comprising:
receiving a reference voltage at a first input of an error amplifier and a feedback voltage at a second input of the error amplifier;
comparing the reference voltage with the feedback voltage for driving a power transistor of the voltage regulator;
comparing an output voltage of the voltage regulator with a fault reference voltage; and
in response to determining that the output voltage of the voltage regulator is less than the fault reference voltage:
driving the power transistor using an internal node of the error amplifier by changing states of a first switch and a second switch; and
supplying the reference voltage to both the first and second inputs of the error amplifier by changing states of a third switch and a fourth switch.

13. The method of claim 12, further comprising:
generating a first control signal and a second control signal in response to determining that the output voltage of the voltage regulator is less than the fault reference voltage, wherein the first control signal is in a reverse logical level of the second control signal.

14. The method of claim 13, wherein changing states of the first and second switches includes switching off the first switch by the first control signal and switching on the second switch by the second control signal.

15. The method of claim 13, wherein changing states of the third and fourth switches includes switching on the third switch by the second control signal and switching off the fourth switch by the first control signal.

16. A system comprising:
- an error amplifier configured to control an output current of a voltage regulator, the error amplifier having a first input, a second input, an output, and an internal node, a reference voltage being coupled to the first input;
- a transistor configured to supply the output current;
- a voltage divider circuit configured to provide a feedback loop over the second input of the error amplifier; and
- a modification stage configured to limit the output current during a fault condition, the modification stage including:
  - a first switch coupled between the output and the transistor;
  - a second switch coupled between the internal node and the transistor;
  - a third switch coupled between the first input and the second input;
  - a fourth switch coupled between the second input and the voltage divider circuit; and
  - a monitoring stage configured to:
    - compare an output voltage of the voltage regulator with a fault reference voltage;
    - determine that the output voltage is less than the fault reference voltage; and
    - in response to determining that the output voltage is less than the fault reference voltage, detect the fault condition and generate a control signal to control states of the first, second, third, and fourth switches.

17. The system of claim 16, wherein the control signal causes a voltage of the internal node of the error amplifier to drive the transistor by switching off the first switch and switching on the second switch.

18. The system of claim 16, wherein the control signal causes the reference voltage to be coupled to both the first and second inputs of the error amplifier by switching on the third switch.

19. The system of claim 16, wherein the control signal causes the voltage divider circuit to be disconnected from the second input of the error amplifier by switching off the fourth switch.

20. The system of claim 16, wherein the voltage regulator is a low-dropout linear regulator, and the transistor is a ballast transistor of the low-dropout linear regulator.

* * * * *